UNITED STATES PATENT OFFICE.

ANDREW A. DUNHAM, OF BAINBRIDGE, NEW YORK, AND HENRY V. DUNHAM, OF VELASCO, TEXAS, ASSIGNORS TO CASEIN COMPANY OF AMERICA, OF NEW YORK, N. Y., A CORPORATION OF NEW JERSEY.

ADHESIVE AND METHOD OF MAKING THE SAME.

1,053,719.

No Drawing.

Specification of Letters Patent. Patented Feb. 18, 1913.

Application filed May 9, 1911. Serial No. 626,117.

*To all whom it may concern:*

Be it known that we, ANDREW A. DUNHAM and HENRY V. DUNHAM, citizens of the United States, residing in Bainbridge, county of Chenango, State of New York, and Velasco, county of Brazoria, State of Texas, respectively, have invented certain new and useful Improvements in Adhesives and Methods of Making the Same; and we do hereby declare the following to be a full, clear, and exact description of the invention, such as will enable others skilled in the art to which it appertains to make and use the same.

Our invention relates to certain new and useful improvements in the treatment of starch to make it suitable for the coating of paper. It is based upon the discovery that by the action of a suitable agent, such as oxalic acid, the starch can be appropriately modified, and the modification can be arrested at a stage which will adapt the resulting product for subsequent admixture with a suitable mineral base or filler to produce a coating on paper which will be strongly adhesive to the paper.

In the preferred practice of our invention, we contemplate the manufacture of a substantially dry product suitable for storage and transportation as an article of manufacture and sale; although, as will hereinafter more fully appear, the invention, broadly considered, is of such a character that it may be practised, in the coating of paper, without the production of an intermediate dry product.

In the preferred practice referred to, we first treat the starch without breaking up the starch granules and with the employment of the minimum amount of water as the dissolving medium for the modifying agent, i. e. an amount sufficient to bring the modifying agent into intimate contact with the individual starch granules throughout the mass; we then dry the mass until it has been brought back to substantially the condition of dryness of the original starch, which usually contains from 9% to 10% by weight of moisture. The drying operation is preferably conducted *in vacuo* and at a temperature insufficient to break up the starch granules, and the modifying action of the acid is continued, under the stimulating effect of the existing temperature conditions prevailing in the vacuum drier, until arrested at a stage corresponding to the viscosity contemplated for ultimate incorporation with the mineral base. In order to thus arrest the modification and to positively insure against its recurrence in the mass, we employ an alkaline re-agent of any suitable kind and which may be, for instance, an alkali which when added to the acidulated modified starch will act as a neutralizing agent and will so adapt the product that, when added to the mineral base, as hereinafter described, there will result no such thickening up of the same into a pasty mass as would make it unsuitable for paper coating. On the contrary, the product when thus added to the mineral base, will run smoothly when applied by the ordinary coating machines well known to the art. We have found that ammonia possesses this property and we preferably use the same, for the reason that the employment of ammonia permits of the complete neutralization of the mass with the production of a neutral salt and the volatilization of any excess of ammonia employed. To produce the dry product, the neutralized modified starch may then be dried in any usual manner.

In order to more fully describe the details of a typical example of the practice of our invention for the production of a dry product, we will now give an instance of its commercial practice, under preferred conditions: 800 lbs. of the starch to be modified are admixed with a solution consisting of 40 lbs. of oxalic acid crystals dissolved in 200 lbs. of water, and the mixture is stirred in an apparatus of the type of a dough mixer or the like until the solution has been uniformly and homogeneously incorporated with the starch granules. At the conclusion of the mixing operation, the starch mass will have absorbed the solution of oxalic acid and will be sufficiently damp so that, if a portion of it is squeezed in the hand, it will have sufficient cohesion to barely ball or cake together, showing the imprint of the fingers. In some instances, a greater or a less amount of oxalic acid may be employed, but the amount of oxalic acid should preferably not fall below from 30 to 35 lbs. in any case in a mixture of the relative quantities of starch and water above noted. So also, a larger proportion of water may be used but, in that event, a corresponding additional burden would be imposed upon the drying apparatus employed in the next stage of the manufacture. The dampened mass of starch, homogeneously admixed with the solution of oxalic acid, is next introduced into a rotary vacuum drier, which is preferred for the reason that it insures the uniform conduct of the process during this period, and particularly because it permits the speeding up of the drying operation, at a temperature which is safely below the limits of the temperature which would break up the starch granules and convert the mass into a paste. The rotary vacuum drier that we prefer for the purpose would be provided with a steam jacket, which may conveniently be supplied with steam at say 20 lbs. superatmospheric pressure, corresponding to a temperature of about 259° F. Within the vacuum drier, we prefer to maintain a vacuum of say 20 inches, so that the internal temperature, during the drying operation shall be correspondingly restricted well below the limit of the breaking up of the starch granules. It is found that at the termination of a period varying somewhat with the prevailing conditions, but usually about one and one half hours, and while the drier is rotating at an average speed of from five to six revolutions per minute, the water of solution has been practically expelled, leaving the starch with about its original content of moisture, say from 9 to 11% by weight. Under the continued action of the heat, the oxalic acid exerts a continued modifying action upon the starch, and, at this stage of the operation, extreme care must be taken to supervise and test its progress, so that it may neither fall short of nor exceed the limits necessary for the ultimate result. To this end, from time to time, the rotation of the drier is interrupted and a sample of the contents is taken and quickly tested for viscosity. A suitable viscosity test which we have used with successful results consists in comparing the rate of flow of a standard solution of the test sample, neutralized and boiled, as hereinafter specified, with the rate of flow of water through a burette, having a length of 36 inches and an internal diameter of ⅝ths of an inch and delivering 58 c. c. of water in a period of half a minute. To 100 grams of the dry starch is first added 400 grams of cold water. The water and starch are stirred well together and then is added sufficient ammonia of 26° Baumé to make the solution alkalin. The mixture is then heated to between 185° F. and 190° F. thereby breaking up the starch granules. Then enough cold water is added to produce a volume of about 970 c. c. of the mixture at a temperature of 100° F. In the meantime, the burette has been brought to the same temperature and the burette is filled with the solution and its rate of flow tested. When the test of any particular sample, (with due allowance for the time occupied by the making of the test) indicates that the starch in the drum will respond to a viscosity ranging from 40 c c. to 45 c. c. in half a minute from the burette employed, the rotation of the drum is interrupted and its contents are immediately discharged into a second mixing apparatus containing 40 lbs. of 26° ammonia in 200 lbs. of water. The mass is at once vigorously stirred, so as to interrupt the modifying action by thoroughly neutralizing the acid. Thereupon, the neutralized mass of modified starch is dried in any convenient manner as, for instance, by being placed in shallow trays and heated in a drying tunnel or the like. It will usually be found desirable, before placing the neutralized mass in the trays to pass it through a breaker for the purpose of breaking up any lumps that may have formed, so that the drying operation may proceed with corresponding promptness and uniformity. It is unnecessary to take special precautions during the drying of the neutralized mass, inasmuch as there will be no prejudicial changes in the desired characteristics of the modified starch after it has reached this stage of the operation.

In order to make up the composition employed for the coating of lithographer's paper, a suitable mineral base may be employed, as, for instance, kaolin, blanc fixe, satin white, etc. In the case of kaolin, 100 lbs. may be employed intimately mixed with 50 lbs. of water. 25 lbs. of the dry modified starch produced in accordance with the method hereinbefore described is then intimately mixed with 100 lbs. of cold water and the mixture is heated to a temperature such that the starch granules will be broken up, a temperature of about 185° F. to 190° F. ordinarily sufficing for the purpose. The starch product thus obtained is then mixed with the kaolin and water until the whole is in a homogeneous union. The mixture is then strained and is ready for the paper coater, who may use additional water for thinning down purposes, according to the particular character of coating which he wishes to produce for the purpose at hand.

When, for special reasons, it is desired to make use of the fundamental features of our invention, for the production of a composition to be immediately applied to the paper, we may proceed directly with the production of the coating without producing the modified starch in a dry state. In accordance with this practice, we prefer to introduce the starch and the oxalic acid, in the same relative quantities in a volume of water sufficient to bring the starch into suspension, and to then heat the mixture sufficiently to break up the starch granules and expose the broken granules at once to the full action of the oxalic acid. This is entirely feasible on an economical basis, for the reason that the mass thus produced does not require to be dried before being put into use; whereas, for the production of a dry product it is undesirable to thus break up the starch granules for the reason that the resulting paste would be difficult to dry except at considerable expense, and under conditions difficult to effectually supervise and determine.

When, in the modification of the process referred to, the boiling has proceeded until a test sample, containing the same relative weight of starch to water as in the standard solution hereinbefore specified indicates the desired viscosity, the necessary amount of ammonia is added to the vat to effect the entire neutralization of the acid or like modifying agent, and the resultant liquid solution of modified starch is ready for immediate incorporation with the corresponding relative quantity of mineral base for the final coating composition. The mineral base in admixture with the appropriate amount of water is thereupon immediately incorporated with the solution of modified starch, and the composition thus produced is ready after straining, for use as before.

In some instances, we prefer to add to the composition of modified starch, a suitable amount of formaldehyde, to guard against decomposition and fermentative action, when, for any reason, such action is to be apprehended, as, for example, when the exigencies of manufacture or use cause it to be kept temporarily (say over night) in the wet or moist state.

Having thus described our invention, what we claim is:

1. The method of producing an adhesive for use in paper coating, which consists in subjecting a body of starch to the action of oxalic acid and neutralizing it by means of ammonia when it has been so far modified that, thus neutralized, it will have, in admixture in water with a large proportion of a suitable mineral base, strong adhesion, and capability of being applied as a facing coating to paper; substantially as described.

2. The method of producing an adhesive for use in the coating of paper, which consists in subjecting starch to the action of oxalic acid in solution, evaporating the solvent and neutralizing the acid after it has modified the starch to such an extent that when subsequently dissolved with from four to five parts of water and mixed with a large proportion of a suitable mineral base, it will have strong adhesion and capability of being applied as a facing coating to paper; substantially as described.

3. The method of producing an adhesive for use in the coating of paper, which consists in subjecting starch to the action of oxalic acid in solution, evaporating the solvent, arresting and neutralizing the action of the oxalic acid by means of ammonia when the starch has been so far modified that, thus neutralized, it will have, in admixture in water with a large proportion of a suitable mineral base, strong adhesion and capability of being applied as a facing coating to paper, and drying the modified neutralized starch; substantially as described.

4. The method of producing an adhesive for use in the coating of paper, which consists in modifying starch by oxalic acid to such an extent that when admixed with nine parts by weight of water, and neutralized with ammonia and heated to a temperature sufficient to break up its starch granules it will have, after cooling to 100° F. a viscosity ranging from 40 c. c. to 45 c. c. per half minute as measured by a burette delivering 58 c. c. of water per half minute, and then arresting the modification by neutralization; substantially as described.

5. As an adhesive, starch modified by oxalic acid and having the modification arrested at such a point that when admixed with water, with a large proportion of a suitable mineral base, it will be strongly adhesive, and capable of being applied as a coating to paper; substantially as described.

6. As an adhesive, starch modified by oxalic acid to such an extent that when admixed with nine parts by weight of water and neutralized with ammonia and heated to a temperature sufficient to break up its starch granules it will have, after cooling to 100° F., a viscosity ranging from 40 c. c. to 45 c. c. per half minute as measured by a burette delivering 58 c. c. of water per half minute; substantially as described.

In testimony whereof we affix our signatures in the presence of two witnesses.

ANDREW A. DUNHAM.
HENRY V. DUNHAM.

Witnesses:
WARD C. LOOMIS,
R. C. WILCOX.